Figure 3:
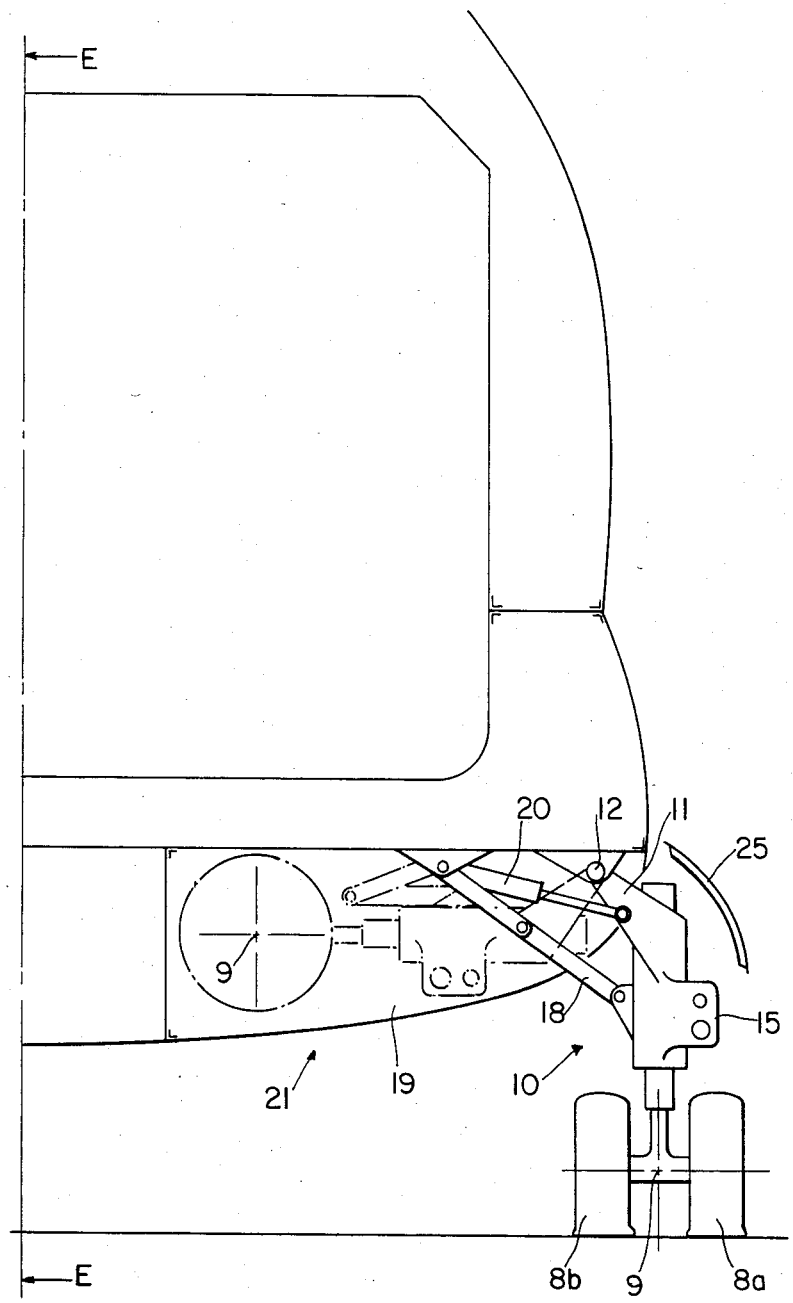

United States Patent [19]

Günter et al.

[11] Patent Number: 4,638,962
[45] Date of Patent: Jan. 27, 1987

[54] JUMBO AIRCRAFT, IN PARTICULAR OF HIGH-WING MONOPLANE DESIGN

[75] Inventors: Heinz Günter, Friedrichshafen; Gerhard Kriechbaum, Markdorf; Hubert Krojer, Bermatingen; Rudolf Matecki, Markdorf; Johannes Spintzyk, Friedrichshafen, all of Fed. Rep. of Germany

[73] Assignee: Dornier GmbH, Friedrichshafen, Fed. Rep. of Germany

[21] Appl. No.: 135,548

[22] Filed: Mar. 31, 1980

[30] Foreign Application Priority Data

Jun. 20, 1979 [DE] Fed. Rep. of Germany ....... 2924742

[51] Int. Cl.⁴ ..................... B64C 13/16; B64C 25/04
[52] U.S. Cl. ................................ 244/203; 244/76 R; 244/102 R
[58] Field of Search ............... 244/203, 15, 207, 202, 244/183, 100 R, 102 R, 50, 187; D12/343

[56] References Cited

U.S. PATENT DOCUMENTS

| | | | |
|---|---|---|---|
| D. 202,749 | 11/1965 | Holtby et al. | 244/102 R |
| 2,438,255 | 3/1948 | Stalker | 244/202 |
| 2,538,388 | 1/1951 | Sievers | 244/50 |
| 2,682,311 | 6/1954 | Bishop | 244/50 |
| 3,285,541 | 11/1966 | Fehring et al. | 44/102 R |
| 3,310,259 | 3/1967 | Swiff et al. | 244/187 |
| 3,315,919 | 4/1967 | Perdue | 244/102 R |
| 3,362,659 | 1/1968 | Razak | 244/15 |
| 3,478,988 | 11/1969 | Roed | 244/102 R |
| 3,556,440 | 1/1971 | Lallemant | 244/50 |
| 3,604,908 | 9/1971 | Loome | 244/187 |
| 3,738,594 | 6/1973 | Donovan et al. | 244/183 |
| 3,945,590 | 3/1976 | Kennedy, Jr. et al. | 244/183 |

*Primary Examiner*—Galen Barefoot
*Attorney, Agent, or Firm*—Ralf H. Siegemund

[57] ABSTRACT

This invention relates to an improvement in a jumbo aircraft, in particular of high-wing monoplane design, with a fuselage and a retractable and steerable main landing gear and a device for high lift generation, the improvement comprising (a) a plurality of rows of landing gear units mounted along the aircraft fuselage and spread across a range extending predominantly in the longitudinal aircraft direction, the units forming the main landing gear, (b) the landing gear units being of the same design and identical dimensions, and (c) a device for switching-on the lift generating device at predetermined lift conditions together with setting and maintaining a longitudinal attitude of the aircraft or of its landing gear parallel to the taxiway and runway, whereby the take-off phase or the landing phase is performed using the method of direct lift control.

3 Claims, 7 Drawing Figures

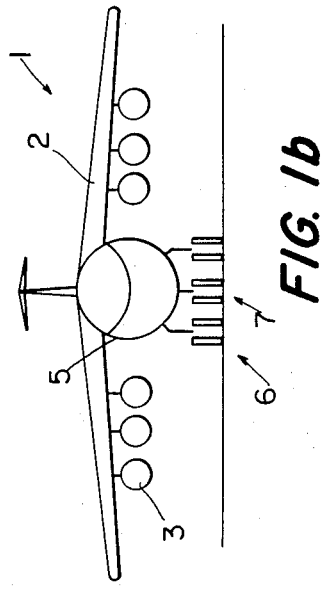
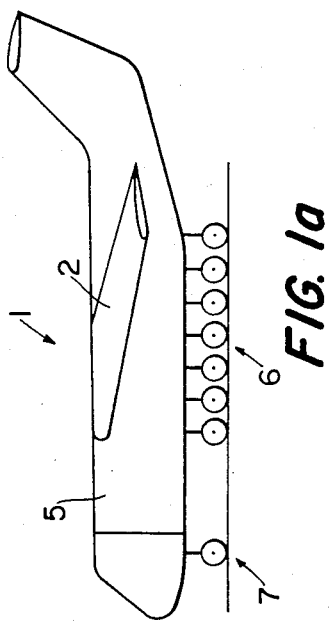
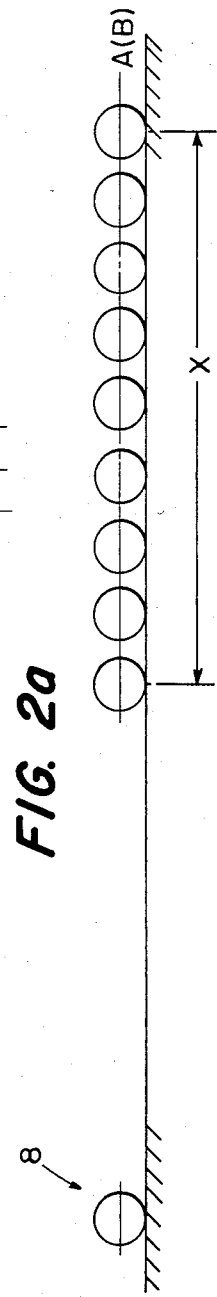
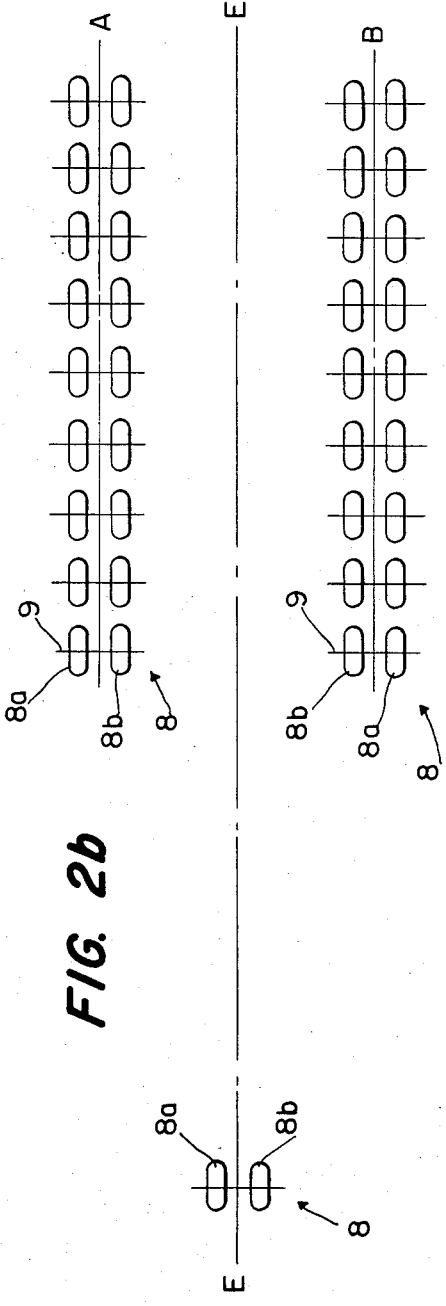

JUMBO AIRCRAFT, IN PARTICULAR OF HIGH-WING MONOPLANE DESIGN

The present invention relates to jumbo aircraft, in particular of high-wing monoplane design, with a retractable and steerable main landing gear, and means for generating high lift.

Both with respect to passenger aircraft and particularly transport planes, there is an increasing trend to larger sizes. The reasons for increasing the size, on one hand, are the better economy so achieved and, on the other, the need to counteract with large aircraft the threatening overcrowding of the air lanes. The increase in traffic furthermore ensures that such aircraft will be loaded to capacity. Especially significant increases must be expected in air freight.

Because of the increase in size, and hence in weight, such aircraft are required to meet a number of further requirements which substantially affect the design and the arrangement of the aircraft landing gear as a function of the airframe structure.

Special attention must be paid in this regard to the transfer of the forces generated, in particular at the landing impact and in general when the aircraft is rolling on the ground, into the airframe structure and to the wear of the tires of the landing gear wheels, furthermore to the design of the landing gear legs, especially as regards spring support means and spring damping.

Favorable conditions regarding the airframe structure and the landing gear might be achieved by dividing the landing gear into a relatively large number of landing gear units and spreading these across a large range in the direction of the aircraft longitude as two or more rows.

Such a design however is hampered by the rotation required about the aircraft transverse axis at take-off and landing for the attack-setting of the support wing. The individual landing gear units on account of the load distribution at the landing gear shifting during rotation then would be required to have mutually difference designs regarding spring excursions and spring dampings.

As regards known designs of the landing gear of heavy aircraft, the landing gear wheels or the landing gear units therefore are spread predominantly in the direction of the transverse aircraft axis, the landing gears being retracted both into the aircraft fuselage and into the support wing.

Furthermore a retractable landing gear for a heavy aircraft is known, for which a relatively large number of landing gear units are arranged in the longitudinal aircraft direction each on one side of the aircraft plane of symmetry. The landing gear units in this design must include the cited different spring excursions, whereby all the landing gear units differ from one another in design.

The known landing gears or landing gear units predominantly spread in the direction of the transverse aircraft axis require a large taxiway and runway widths and possibly landing gear pods at the support wings to form retraction wells. A tandem arrangement of the landing gear wheels results in high tire wear when the aircraft taxies around curves if the landing gear wheels cannot be steered. Furthermore, in the known landing gear designs with the landing gear units spread in the transverse aircraft plane, the lesser directional stability and the pitching of the tail become special criteria when loading.

It is the object of the present invention to so design jumbo aircraft that the transfer of the loads through the landing gear into the framework structure will be spread over as large a region as possible in the longitudinal direction of the aircraft, while simultaneously simplifying to the largest possible extent the design of the landing gear and for the least bulk when in the retracted condition. This problem is solved by combining the following steps, namely:

(a) the retractable main landing gear is formed by a plurality of landing gear units arranged in rows along the aircraft fuselage and extending predominantly in its longitudinal axis, (b) the landing gear units are of identical design and dimensions, and (c) the take-off or landing phase is carried out using the method of Direct Lift Control (DLC) by turning on the lift, or possibly the high-lift generating means for predetermined lift conditions and setting and maintaining a pitch angle of the aircraft, or of its landing gear, which is parallel to the taxiway and runway.

The steps of the invention introduce the feasibility of spreading a number of landing gear units over a large range in the direction of aircraft longitude and to correspondingly spread the landing gear loads into the airframe structure. By means of the direct lift control (DLC), the arrangement of landing gear units along the aircraft longitude can be selected freely to a large extent. When using the direct lift control, the otherwise required aicraft rotation about its transverse axis for the purpose of setting the attack angle modification will be eliminated for take-off and landing. Therefore, all the landing gear units can be of identical design and size (spring support, spring damping). Because of the minor track width of such landing gears together with the steering of the landing gear wheels for aircraft taxiing around curves, take-off or landing runways of conventional widths do suffice. Because of the uniform spreading of the landing gear loads over a large range of the airframe structure in the aircraft longitudinal direction, the local stress on the structure when taxiing and at landing impact is substantially decreased. The tail pitching moments taking place when landing the aircraft are uncritical on account of the arrangement of the landing gear.

Figure 4:
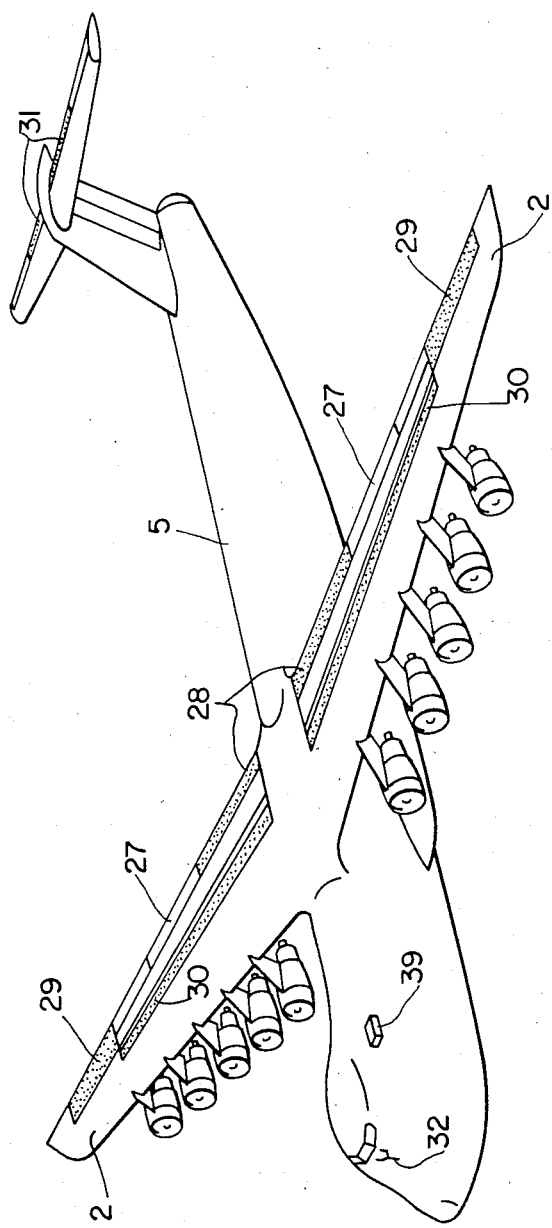
Figure 5:
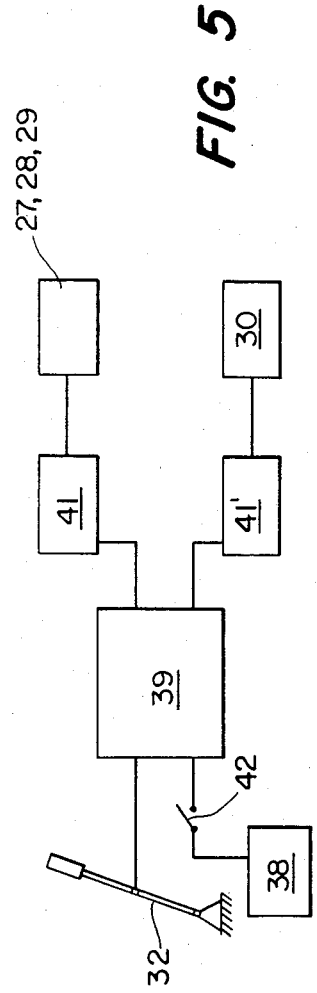

The drawings show one embodiment of the invention, in which:

FIGS. 1a and 1b schematically show a jumbo aircraft together with the landing gear in side and front views respectively, FIGS. 2a and 2b schematically show the overall arrangement of the aircraft landing gear in side and top views, respectively, FIG. 3 is a cross-section of the aircraft fuselage showing constructional items of the aircraft landing gear, FIG. 4 is a perspective view of the aircraft together with the control surfaces which are actuated for the direct lift control, and FIG. 5 is a block diagram of the simplified design of the aircraft control system.

The illustrated aircraft shown in the drawings is a freight model with a take-off weight in the rage of 1,000 tons.

As can be seen from FIGS. 1a through 2b, the overall aircraft is denoted by 1, the support wing by 2 and the engines by 3. The main landing gear 6 is mounted along the aircraft fuselage 5 and the nose landing gear 7 is mounted to the aircraft nose.

As shown by FIGS. 2a and 2b, the main landing gear is composed of two rows A and B respectively of landing gear units 8 on both sides of the aircraft plane of symmetry E—E. Dual landing gear wheels 8a and 8b on a common wheel axle 9 are associated with each of the landing gear units 8. The nose landing gear 7 is composed of a landing gear component 8 with landing gear wheels 8a and 8b. As further shown by FIG. 2a, the main landing gear 6 is spread across a range X, with the center of this range being approximately intersected by a vertical plane containing the center of gravity $S_p$.

FIG. 3 illustrates one of the identically designed landing gear units 8 in detail. Each of the landing gear units 8 comprises a landing gear leg 10, which by means of a landing gear yoke 11 and a pivot bearing pin 12 acts on a bearing projection of the airframe structure. The landing gear leg 10 contains the hydraulically operated wheel steering system 15 which is electrically controlled. As the wheel steering system is of a generally conventional design, it is not described herein further for the sake of simplicity.

The spring support with damping is housed in the landing gear leg 10. Furthermore, an operational cylinder 20 is provided for retracting or extending the landing gear units 8. The landing gear is braced by a foldable brace 18. The landing gear units 8 are retracted into the retraction wells 19 between two main bulkheads 21. The landing gear units 8 are mounted underneath and to the side of the aircraft plane of symmetry E—E, whereby the landing gear loads are transferred tangentially into the fuselage structure, i.e., into the main bulkhead 21. The retracted position of one of the landing gear units 8 is shown in FIG. 3 in phantom. It is clear that the retracted position of the wheel axles is rotated by 90° with respect to the extended position. The retraction wells 19 can be closed by the cover flaps 25.

FIGS. 4 and 5 show, in simplified form, the aircraft flaps and the ancillary controls for the direct lift control.

The air control at the support wing 2 contains flaps located inside and outside, denoted by 28 and 29, respectively, for the control of direct lift, maneuvering and gust loads, also spoiler flaps 30 which also are used for direct lift control. The support wing 2 further is provided with the control flaps 27 for the control of roll and direct lift. The aircraft elevator is denoted by 31 and the control means for the pilot by 32.

As shown in closer detail in FIG. 5, a signal matching means is provided for the control commands from the pilot control means 32 and the measuring sensors 38, of which the outputs are applied to an on-board computer 39 for signal processing. Sensors 38, for instance, may be instruments for measuring the dynamic pressure or otherwise they may be instruments for measuring the changes in the landing gear loads. Quick-acting adjusting means (adjusting motors) 41 or 41' are controlled by the on-board computer 39, whereby the flaps 27, 28, 29, and 30, are adjusted.

When using the method known as "Direct Lift Control" (DLC), the aircraft takes off keeping its ground-roll position, in which all the wheels of the landing gear 6 or 7 touch the runway, without there being rotation, that is, without moving about the aircraft transverse axis.

To that end, during the take-off phase, i.e. when reaching a predetermined speed when moving on the ground, the lift-generating flaps 27, 28, or 29, are moved from their neutral position into the lift position. To control the lift, both the inside and outside flaps 27, 28, and 29, and also the spoiler flaps 30 can be used. The flaps are adjusted at a predetermined rate. To ensure the desired aircraft longitudinal position, the elevator 31 may have to be moved into an active position.

The flight attitude in the sense of an aircraft motion with axial offset with respect to the longitudinal slope of the longitudinal position of the aircraft during the take-off phase is maintained up to a predetermined height of flight above the ground rolling process. The direct lift control phase is followed by the conventional rotation of the aircraft about its transverse axis achieved by adjusting the elevator 31 for setting the angle of attack of the aircraft support wing 2 for the further course of the take-off phase.

The lift-generating flaps 27, 28, 29, and 30, during the take-off or landing phase can be manually activated by corresponding pilot control commands by means of the control means 32 when the required lift conditions are present, as indicated by the display of the measuring instruments.

The activation, i.e., the setting of the flaps, also can be performed automatically for the embodiment shown in FIG. 5. In this case, a switch means 42 actuated by the pilot connects the sensors 38 to the on-board computer 39. The output values from the sensors form signals in the on-board computer for controlling the setting means 41 and 41' of flaps 27, 28, 29, and 30, which then are automatically set as a function of the measured values within a predetermined activation range. The flaps 27, 28, 29, or 30, are returned into their rest positions either manually by the pilot or again as a function of the sensors.

As regards the landing phase with direct lift control without rotating the aircraft about its transverse axis, the setting motors 41 and 41' are so controlled by means of the sensors 38 and the on-board computer 39 that the flaps 27, 28, 29, and 30, cause a horizontal touchdown with nearly simultaneous ground contact of the wheels of all landing gear units and contributing to the braking of the aircraft.

Thus the direct lift control permits the take-off or landing of aircraft while keeping their horizontal longitudinal attitude, without rotating about their transverse axis, and thusly when using a landing gear design comprising a plurality of landing gear units spread predominantly over a range in the longitudinal direction of the aircraft, thereby allowing satisfactory transfer of the loads into the airframe structure, with identical design and dimensions of the landing gear units.

It will be obvious to those skilled in the art that many modifications may be made within the scope of the present invention without departing from the spirit thereof, and the invention includes all such modifications.

What is claimed is:

1. In a jumbo aircraft, in particular of high-wing monoplane design, with a fuselage and a retractable and steerable main landing gear and means for high lift generation, the improvement comprising:
    (a) a plurality of rows of landing gear units mounted along the aircraft fuselage and spread across a range extending predominantly in the longitudinal aircraft direction, the number of said landing gear units extending in the longitudinal aircraft direction being a multiple of the number of landing gear units mounted in the direction of the aircraft transverse axis, said units forming said main landing gear.

(b) said landing gear units being of the same design and identical dimensions, (c) means for switching-on the lift generating means at predetermined lift conditions, together with setting and maintaining a longitudinal attitude of the aircraft or of its landing gear parallel to the taxiway and runway, whereby the take-off phase or the landing phase is performed using the method of direct lift control; and in which the actuation of the lift generating means is implemented as a function of the predetermined magnitudes of the landing gear loads.

2. A jumbo aircraft according to claim 1 in which control signals for driving setting means of the lift generating means are formed from values measured by sensors by means of a signal processing system.

3. A jumbo aircraft according to claim 2 including a separately operated switch means for switching-on the sensors.

* * * * *